US010751952B2

(12) United States Patent
Lee et al.

(10) Patent No.: US 10,751,952 B2
(45) Date of Patent: Aug. 25, 2020

(54) RESOURCE ALLOCATION FOR DIVIDED 3D PRINTING JOBS

(71) Applicant: KT Corporation, Seongnam-si, Gyeonggi-do (KR)

(72) Inventors: Zucheul Lee, Yongin-si (KR); Daehwan Kim, Yongin-si (KR); Yeong-il Seo, Seoul (KR)

(73) Assignee: KT Corporation, Seongnam-si, Gyeonggi-Do (KR)

( * ) Notice: Subject to any disclaimer, the term of this patent is extended or adjusted under 35 U.S.C. 154(b) by 289 days.

(21) Appl. No.: 14/960,994

(22) Filed: Dec. 7, 2015

(65) Prior Publication Data

US 2016/0167310 A1 Jun. 16, 2016

(30) Foreign Application Priority Data

Dec. 10, 2014 (KR) .......................... 10-2014-0177492

(51) Int. Cl.
*B29C 67/00* (2017.01)
*B33Y 50/02* (2015.01)
*B29C 64/386* (2017.01)
*G05B 19/4099* (2006.01)

(52) U.S. Cl.
CPC ........ *B29C 67/0088* (2013.01); *B29C 64/386* (2017.08); *B33Y 50/02* (2014.12); *G05B 19/4099* (2013.01); *G05B 2219/35134* (2013.01); *G05B 2219/49007* (2013.01); *Y02P 90/265* (2015.11)

(58) Field of Classification Search
CPC .......................................... G05B 2219/49007

USPC ............................................................ 700/98
See application file for complete search history.

(56) References Cited

U.S. PATENT DOCUMENTS

| 10,120,628 | B1* | 11/2018 | Khafizova | G06F 3/1263 |
| 2006/0176515 | A1* | 8/2006 | Ueda | H04N 1/2338 |
| | | | | 358/1.15 |
| 2007/0115493 | A1* | 5/2007 | Haginaka | G06F 3/1204 |
| | | | | 358/1.14 |
| 2011/0279862 | A1* | 11/2011 | Mori | G06F 3/1205 |
| | | | | 358/1.15 |
| 2012/0092724 | A1* | 4/2012 | Pettis | B29C 67/0088 |
| | | | | 358/1.15 |
| 2012/0200882 | A1* | 8/2012 | Ito | G06F 3/1205 |
| | | | | 358/1.15 |
| 2014/0185083 | A1* | 7/2014 | Cudak | G06F 3/1211 |
| | | | | 358/1.15 |
| 2015/0057784 | A1* | 2/2015 | Butler | B29C 67/0088 |
| | | | | 700/119 |

(Continued)

FOREIGN PATENT DOCUMENTS

KR 10-2013-0044649 A 5/2013
KR 10-2014-0102240 A 8/2014

*Primary Examiner* — Emilio J Saavedra
(74) *Attorney, Agent, or Firm* — Hamre, Schumann, Mueller & Larson, P.C.

(57) ABSTRACT

3D printing may include receiving 3D modeling data from a device, transmitting information regarding available 3D printers in a cloud environment to the device, receiving a request to divide a printing task from the device, selecting at least one of the available 3D printers, dividing the 3D modeling data into portions of sub-data based on the request, matching respective portions of the sub-data to at least one of the selected 3D printers.

12 Claims, 10 Drawing Sheets

(56) References Cited

U.S. PATENT DOCUMENTS

2015/0205544 A1* 7/2015 Webb .................. G06F 3/126
                                                            358/1.15
2015/0220291 A1* 8/2015 Tapley ................ G06F 3/1211
                                                            358/1.15

* cited by examiner

RESOURCE ALLOCATION FOR DIVIDED 3D PRINTING JOBS

BACKGROUND 3D printing is a technology for creating a three-dimensional objects based on three-dimensionally designed data by synthesizing various materials. The 3D printing, called a third industrial revolution, is expected to change technological paradigms in numerous fields including the manufacturing field and foster industrial innovation.

Methods of making three-dimensional objects are divided into an additive manufacturing method that manufactures a three-dimensional object by stacking a solid specific material, and a subtractive manufacturing method that cuts or sharpens a three-dimensional object through machine processing. The subtractive manufacturing method is performed by a 4- or 5-axis processor, and has been already commercialized and widely used in industrial fields.

Additive manufacturing methods include a fused deposition modeling (FDM) method by which a plastic material is melted and is sprayed out by a nozzle. This method is a relatively cheap 3D printing solution, and is believed to reduce consumption of materials relative to other 3D printing methods. Additive manufacturing methods also include a selective laser sintering (SLS) method by which a product is made by thinly spreading a powder material on a field and sintering only a selected part using a laser. 3-dimensional printing (3DP) includes thinly spreading a powder-like material, like the SLS method, but spraying an adhesive and allowing it to hard, instead of applying a laser to it.

3D printing is prefaced by processes that include: 3D modeling; standard tessellation language (STL) or additive manufacturing format (AMF) file conversion; G-code conversion; and real object printing using a host program.

3D modeling pertains to forming an object in a three-dimensional configuration using computer aided design (CAD) software, animation modeling software such as Maya and MAX, a 3D scanner, etc. The resulting 3D modeling data may be converted to an STL file that can be received and processed by a 3D printer. The conversion into the STL file is performed by common CAD software.

SUMMARY

In one example embodiment, a 3D printing method includes receiving 3D modeling data from a device, transmitting information regarding available 3D printers in a cloud environment to the device, receiving a request to divide a printing task from the device, selecting at least one of the available 3D printers, dividing the 3D modeling data into portions of sub-data based on the request, matching respective portions of the sub-data to at least one of the selected 3D printers, and transmitting, to respective ones of the selected 3D printers, a request to print one or more portions of the 3D modeling data in accordance with the sub-data.

In another example embodiment, a 3D printing system includes a device that includes a 3D modeling data transmitter that transmits 3D modeling data to a 3D printing server, and a printing request transmitter that transmits a request to complete at least a portion of a 3D printing job to the 3D printing server. The 3D printing system also includes the 3D printing server which includes a 3D printer provider that transmits, to the device, information regarding available 3D printers in a cloud environment, a 3D printer selector that selects at least one of the available 3D printers, a 3D modeling data divider that divides the 3D modeling data into multiple portions of sub-data based on the separation printing request, a data manager that matches respective portions of the sub-data with at least one of the selected 3D printers, and a printing task manager that transmits, to at least one of the selected 3D printers, a request to print one or more portions of the 3D modeling data in accordance with the sub-data. The 3D printing system also includes a plurality of the 3D printers that print at least portions of the 3D modeling data in accordance with the received request.

In at least one more example embodiment, a computing device includes a memory and a processing unit. The processing unit receives 3D modeling data, transmits information regarding available 3D printers in a cloud environment, receives a request to divide a printing job, selects at least one available 3D printer, divides the 3D modeling data into portions of sub-data based on the request to divide the printing job, matches respective portions of the sub-data to at least one of the selected 3D printers, and transmits a request to print one or more portions of the 3D modeling data in accordance with the sub-data.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

As referenced herein, slicing of 3D modeling data may refer to translating 3D modeling data into individual layers, in the aforementioned 3D shape, to be used as machine code for subsequent printing.

Further still, as referenced herein, G-code may refer to a numerical language, utilized by a program, application, or code to slice 3D modeling data, that may be used to provide instructions to a 3D printer. The printing instructions may include height, width, and thickness parameters for each of the individual layers. In particular, G-code may include 3-dimensional coordinate values that may be used to guide a nozzle of a 3D printer.

By connecting a multiple number of 3D printers based on a cloud service, dividing 3D modeling data into at least one modeling data and outputting a 3D object, it is possible to dramatically reduce output time.

By accomplishing an integrated host for controlling a 3D printer in a cloud environment, it is possible to omit cumbersome processes such as pre-investigating processes.

Figure 1:
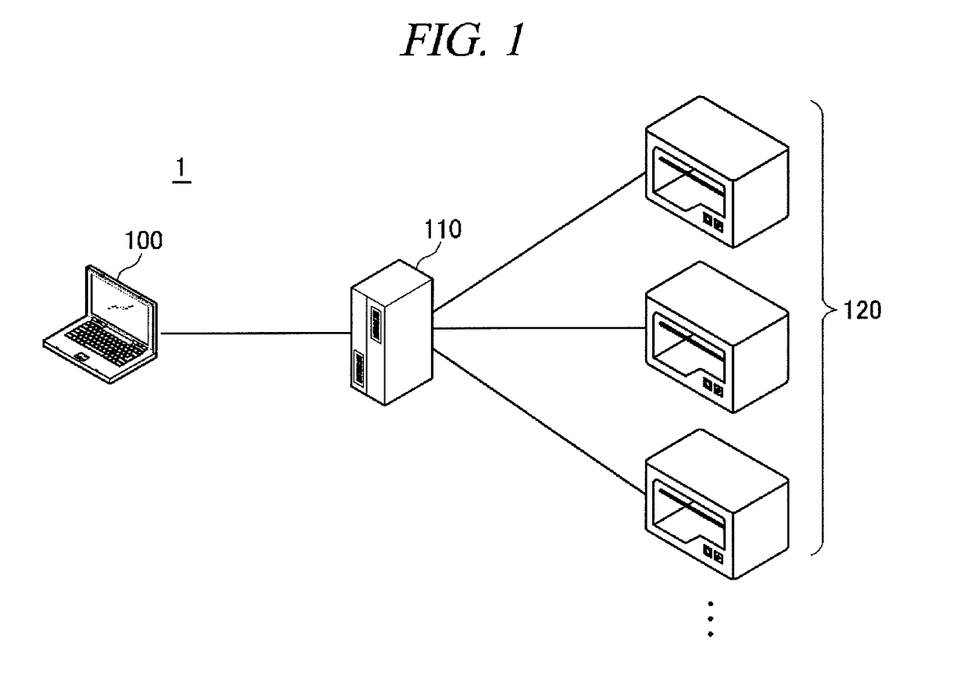
FIG. 1 is a depiction of a system to implement resource allocation for divided 3D printing jobs, in accordance with example embodiments described herein.

FIG. 1 is a depiction of a system to implement resource allocation for divided 3D printing jobs, in accordance with example embodiments described herein. Referring to FIG. 1, a cloud-based 3D printing system 1 may include a user terminal 100, a cloud-based 3D printing server 110 and multiple 3D printers 120. However, the cloud-based 3D printing system of FIG. 1 is merely an example embodiment of the present disclosure, and thus, should not be construed as being limited to FIG. 1.

User terminal 100 may produce 3D modeling data using various types of software that may be hosted, executed, and/or instantiated on user terminal 100 or on a corresponding cloud resource. In another example embodiment 3D printing recommendation system 1 may implement software that allows user terminal 100 to produce the 3D modeling data. User terminal 100 may transmit the produced 3D modeling data to a 3D printing management server 110. The 3D modeling data may be produced in accordance with, e.g., standard tessellation language (STL), additive manufacturing format (AMF), etc.

The user terminal 100 may include a user interface (UI) to enable a user to activate transmission of the 3D modeling data to cloud-based 3D printing server 110.

User terminal 100 may transmit, to cloud-based 3D printing server 110, a signal that includes a request that, at least, indicates that a printing task or job is to be divided for more efficient processing by at least two of the available 3D printers that are connected to cloud-based 3D printing server 110. The aforementioned UI of user terminal 100 may display a listing or representation of the available 3D printers, as provided by cloud-based 3D printing server 110. In accordance with at least some embodiments, the UI may enable the user to interact with user terminal 100 to select at least one of the available 3D printers and, further, request that a 3D printing job or task be divided.

Cloud-based 3D printing server 110 may store or otherwise host and execute a program to connect a driver and a slicer for each 3D printer corresponding to a cloud environment. For example, one or more 3D printers 120 may be connected to a cloud environment, and a driver of each of the one or more 3D printers 120 may be integrated with a host. In addition, a slicer compatible with each of the one or more printers 120 may be linked to the host.

In accordance with some example implementations, cloud-based 3D printing server 110 may receive a 3D modeling file (or data) from user terminal 100, and then search for available 3D printers in the cloud environment. However, in accordance with some alternative implementations, cloud-based 3D printing server may search for available 3D printers prior to receiving a request from the user terminal 100 by, e.g., pinging connected servers on at least a semi-regular basis. Regardless, cloud-based 3D printing server 110 may transmit, or otherwise provide, gathered information regarding the availability of connected 3D printers to user terminal 100.

As referenced herein, a 3D printer may be deemed to be available when that 3D printer meets any one or more of the following non-limiting example conditions: with less than a threshold number, e.g., three, of queued printing tasks and/or within a threshold amount of time, e.g., 15 minutes, of finishing all previously queued printing tasks.

In accordance with at least some of the aforementioned example embodiments, cloud-based 3D printing server 110 may receive a signal transmitted from user terminal 100 requesting selection of at least one of the available 3D printers and/or requesting that a 3D printing task or job be processed in whole by one of the available 3D printers or in part by at least two of the available 3D printers.

In accordance with some of the example implementations, cloud-based 3D printing server 110 may divide the received 3D modeling data in response to the signal received from user terminal 100 to divide the 3D printing task or job, and may further assign at least one portion of the divided modeling data to the at least one selected 3D printer.

Further, cloud-based 3D printing server 110 may transcode G-code corresponding to each portion of the divided 3D modeling data, and transmit the transcoded G-code to each of the available 3D printers to which at least a portion of the divided 3D modeling data has been assigned.

3D printers 120 are devices that may receive the G-code and output a 3D solid figure corresponding to the 3D modeling data. Though FIG. 1 depicts three embodiments of 3D printers 120, the examples described here are not so limited in quantity nor are they limited to certain 3D printers. That is, the examples depicted and described are non-limiting.

One or more of 3D printers 120 may receive G-codes corresponding to divided 3D modeling data from the cloud-based 3D printing server 110, and subsequently output the 3D modeling data corresponding to the G-codes transmitted from the cloud-based 3D printing server 110.

Figure 2:
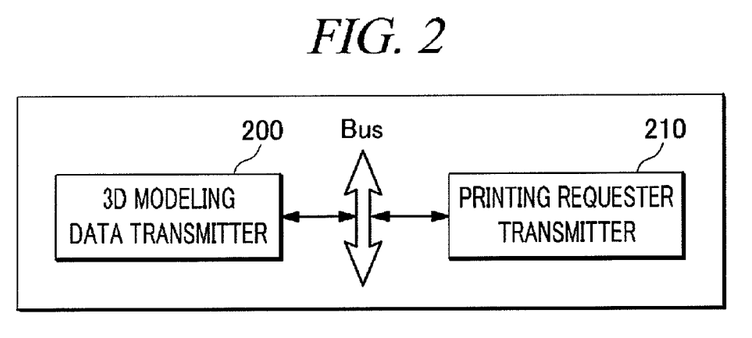
FIG. 2 shows a block diagram of a user device to implement at least portions of resource allocation for divided 3D printing jobs, in accordance with example embodiments described herein.

FIG. 2 shows a block diagram of a user device to implement at least portions of resource allocation for divided 3D printing jobs, in accordance with example embodiments described herein. In accordance with at least some implementations, user terminal 100 may include 3D modeling data transmitter 200 and printing request transmitter 210.

3D modeling data transmitter 200 may be configured, programmed, and/or designed to transmit 3D modeling data to cloud-based 3D printing server 110. The 3D modeling data may be produced in accordance with, e.g., standard tessellation language (STL), additive manufacturing format (AMF), etc.

User terminal 100 may include a user interface (UI) to enable a user to activate transmission of the 3D modeling data to cloud-based 3D printing server 110.

Printing request transmitter 210 may be configured, programmed, and/or designed to select at least one of the available 3D printers identified by cloud-based 3D printing server 110. Printing request transmitter 210 may also be configured, programmed, and/or designed to request that a printing task or job be divided among two or more of the selected available 3D printers. The user interface (UI) corresponding to user terminal 100 may be configured, programmed, and/or designed to display or otherwise identify the available 3D printers identified by cloud-based 3D printing server 110, enable the user to select at least one of the available 3D printers to complete the divided 3D printing task or job, and request that the 3D printing task or job be started. In some embodiments, the divided 3D printing task or job may be assigned to one of the selected available 3D printers, to be processed serially. More likely though, for the sake of efficiency, the divided 3D printing task or job may be assigned to at least two of the selected available 3D printers.

The signal that includes a request that indicates that a printing task or job is to be divided for more efficient processing by at least two of the available processors may include information regarding at least one of a printing material to be used for at least a portion of the 3D printing task or job, a level of printing precision for at least a corresponding portion of the 3D printing task or job, a printing color or colors to be used for at least the corresponding portion of the 3D printing task or job, and an amount of time within which the assigned 3D printing task or job is to be completed or a relative speed setting, e.g., "high," "medium," or "low," within which to complete the assigned 3D printing task or job. At least some of that information, included in the signal having the request, may be entered by the user via the aforementioned UI. For example, when requesting the divided printing task or job, the user terminal 100 may transmit a divisional printing signal that identifies "ABS and PLA" as the printing materials to be used, requests a moderate level of precision, and "fast" as the printing speed setting, to cloud-based 3D printing server 110.

Figure 3:
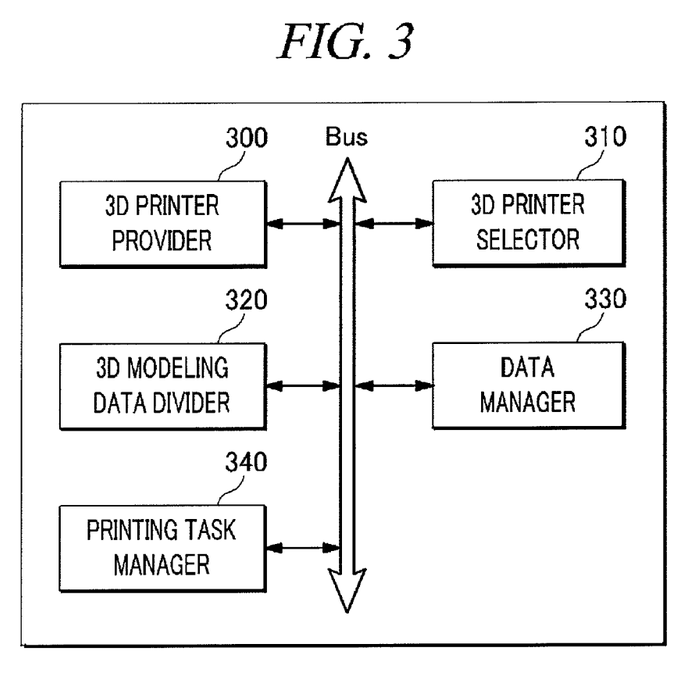
FIG. 3 shows a block diagram of a 3D printing server to implement at least portions of resource allocation for divided 3D printing jobs, in accordance with example embodiments described herein.

FIG. 3 is a block diagram of a 3D printing server to implement at least portions of resource allocation for divided 3D printing jobs, in accordance with example embodiments described herein. In accordance with at least some implementations, cloud-based 3D printing server 110 may include 3D printer provider 300, 3D printer selector 310, 3D modeling data divider 320, data manager 330 and printing task manager 340.

3D printer provider 300 may be configured, programmed, and/or designed to transmit, to user terminal 100, information regarding the available 3D printers in the cloud environment. Non-limiting examples of such information are shown and described with regard to FIGS. 5A, 5B, and 5C.

Figure 5A:
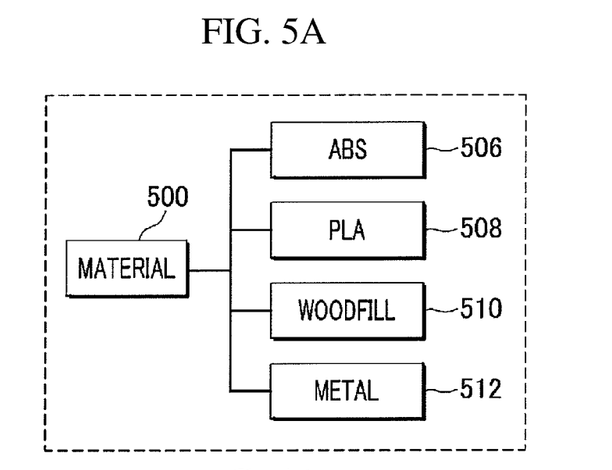
FIGS. 5A, 5B, and 5C show examples of information included in a request to divide a printing task or job, in accordance with example embodiments described herein.
Figure 5B:
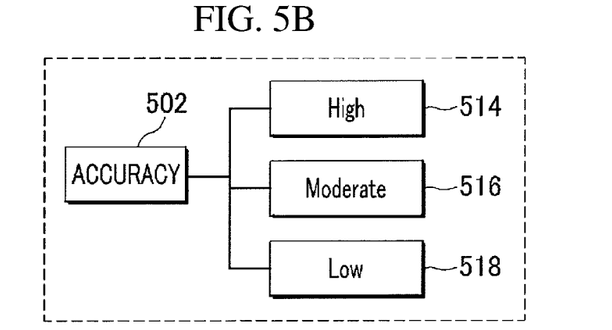
Figure 5C:
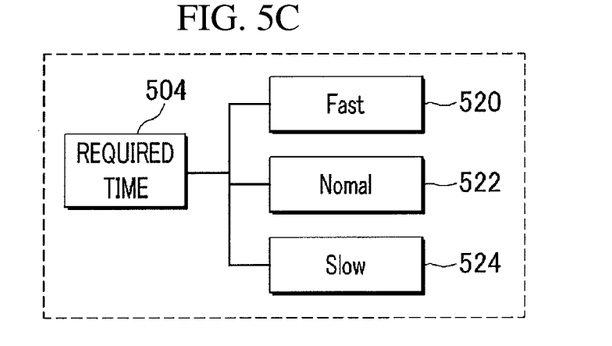

FIGS. 5A, 5B, and 5C show examples of information included in a request to divide a printing task or job, in accordance with example embodiments described herein.

3D printers 120, shown in FIG. 1, may be managed by cloud-based 3D printing server 110. For example, 3D printing server 110 may manage the respective 3D printers 120 in accordance with categorized capabilities thereof. In at least some embodiments, example categories of capabilities may include an ability to perform 3D printing using particular materials 500, achieving at least a relative level of precision 502, and/or complete at least a portion of a 3D printing task or job within a relative rate of speed or level of time 504, etc.

In the example of FIG. 5A, materials 500 may include acrylonitrile-butadiene-styrene (ABS) resin 506, poly lactic acid (PLA) 508, WOODFILL 510, and metal 512, etc.

In the example of FIG. 5B, relative levels of precision 502 may include high 514, moderate 516, and low 518. Thus, a respective one of 3D printers may be categorized as being capable of completing at least a portion of a 3D printing task or job at a high level of precision 514, a normal level of precision 516, or a low level of precision 518.

In the example of FIG. 5C, relative levels of time 504 may include fast 520, moderate 522, and slow 524. Thus, a respective one of 3D printers may be categorized as being able of completing at least a portion of a 3D printing task or job at a relative fast rate of speed, a normal rate of speed, or a relative low rate of speed.

The performance of the respective 3D printers 120 may be categorized in accordance with one or more of the aforementioned example capabilities. For example, a particular one of 3D printers 120 may be categorized as being capable of completing at least a portion of a 3D printing task or job that uses the materials ABS 506 and metal 512, at a relatively high level of precision 514.

Figure 6:
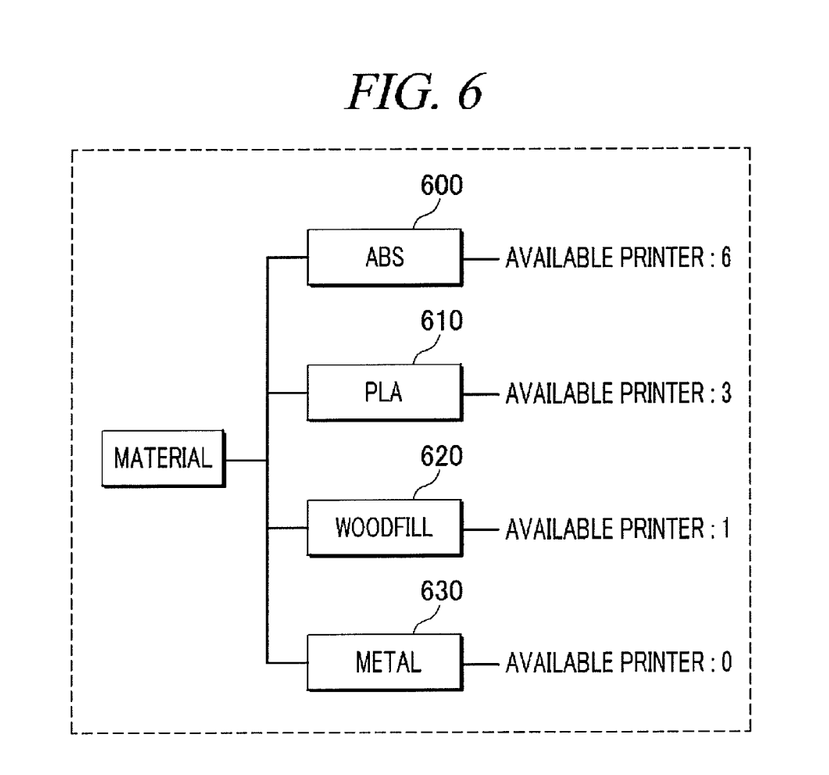
FIG. 6 depicts a divided printing task or job, in accordance with example embodiments described herein.

FIG. 6 depicts a divided printing task or job, in accordance with example embodiments described herein. 3D printer provider 310 may transmit categorized information regarding one or more available 3D printers 120 to user terminal 100. Thus, for example, user terminal 100 may show, using the aforementioned UI, that six (6) 3D printers are currently available to complete at least a portion of a 3D printing task or job using the material ABS 600, three (3) 3D printers are currently available to complete at least a portion of a 3D printing task or job using the material PLA 610, one (1) 3D printer is currently available to complete at least a portion of a 3D printing task or job using the material WOODFILL 620, but that there is no printer currently available to complete at least a portion of a 3D printing task or job using metal 630.

In accordance with the example, a divided 3D printing request may be made with reference to the information regarding the capabilities of the available 3D printers received from the user terminal 100. Thus, for example, since there is no 3D printer currently available to complete at least a portion of a 3D printing task or job using metal 630, the part of the 3D printing task or job intended to be output with metal may be changed to be output with other materials. Alternatively, the request for portions of the 3D printing task or job intended to be completed using materials other than metal may be transmitted while the request for the portion of the 3D printing task or job intended to be completed using metal may be deferred until a 3D printer with such capability becomes available.

Returning to FIG. 3, 3D printer selector 310 may be configured, programmed, and/or designed to select at least one of 3D printers, from the available 3D printers based on the received request that includes specified requirements. For example, in compliance with a request for at least a portion of a 3D printing task or job to be completed using the material ABS at a high level of precision, 3D printer selector 320 may select an available one of 3D printers 120 having such categorized capabilities. If the available 3D printers are unable to satisfy all requested conditions for portions of the divided 3D printing request, cloud-based 3D printing server 110 may request that the conditions of the request be revised.

3D modeling data divider 330 may be configured, programmed, and/or designed to divide the 3D modeling data into multiple portions of sub-data based on the request to complete at least a portion of the 3D printing task or job and to assign the modeling data to at least one selected 3D printer. Further explanation thereof references the example of FIG. 7.

Figure 7:
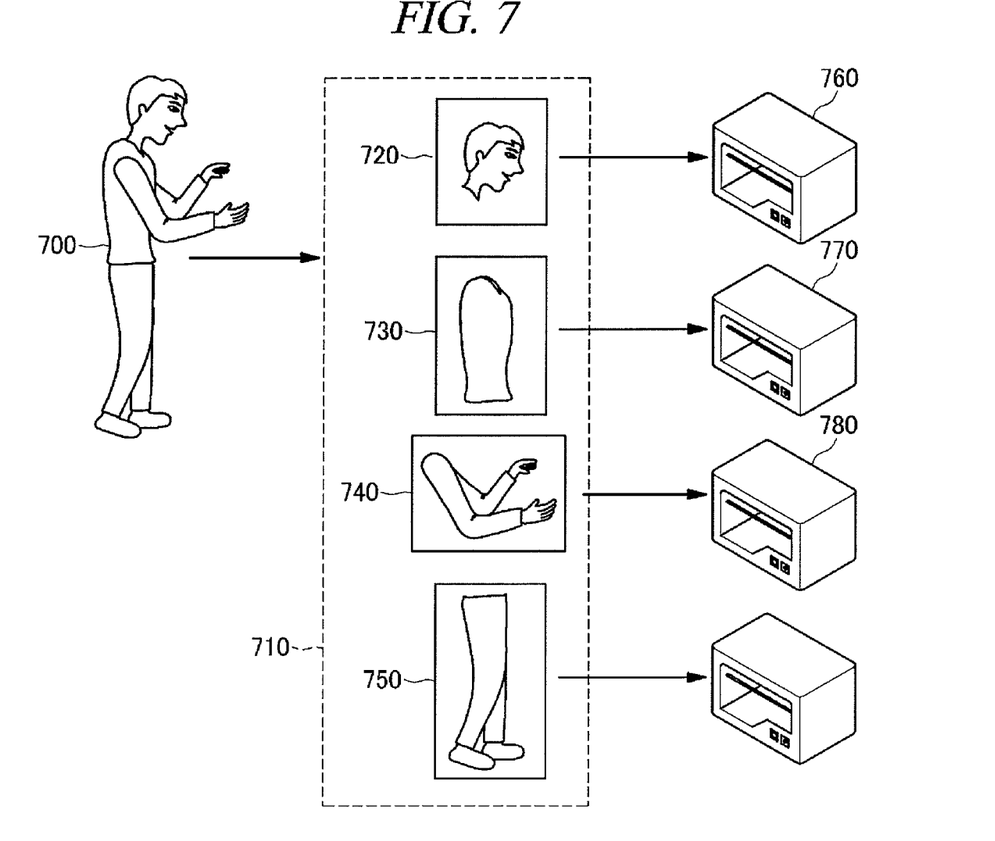
FIG. 7 depicts results of a divided printing task or job, in accordance with example embodiments described herein.

FIG. 7 depicts results of a divided printing task or job, in accordance with example embodiments described herein. For example, 3D modeling data divider 330 may divide 3D modeling data 700 transmitted from the user terminal 100 into multiple tasks or jobs, each having corresponding 3D modeling data 710, that includes one task or job to print a model head 720, a model torso 730, model arms 740, and model legs 750.

Data manager 330, shown in FIG. 3, may be configured, programmed, and/or designed to divide the 3D modeling data 700 into at least one modeling data based on the printing precision included in the divisional printing signal and assign the modeling to at least one 3D printer. Thus, for example, if the signal requesting a divided 3D printing task or job includes requesting a high level of precision for printing 3D modeling 720, a moderate level of precision for printing 3D modeling 730, and a low level of precision for printing 3D modeling 740, data manager 330 may assign 3D modeling 720 to 3D printer 760 that is categorized as being capable of producing a high level of precision, assign 3D modeling 720 to 3D printer 770 that is categorized as being capable of producing a moderate level of precision, and assign 3D modeling 740 to 3D printer 780 that is categorizing as producing a low level of precision.

Figure 8:
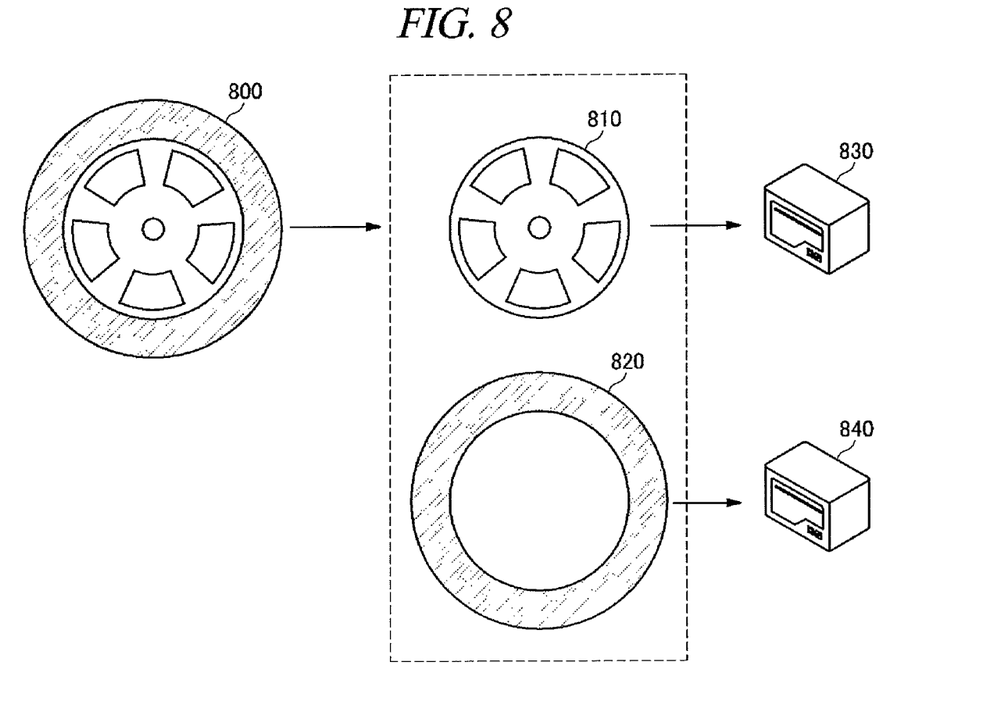
FIG. 8 depicts results of another divided printing task or job, in accordance with example embodiments described herein.

FIG. 8 depicts results of another divided printing task or job, in accordance with example embodiments described herein.

Data manager 330 may divide 3D modeling data 800 into sub-data based on printing material information included in the request, and assign the modeling to at least one 3D printer. For example, if a request for a divided 3D printing task or job includes information indicating that printing for 3D modeling 810 is to be completed using metal and that printing for 3D modeling 820 is to be completed using rubber, data manager 330 may assign 3D modeling 810 to 3D printer 830 that is categorized as being capable of 3D printing using metal and assign 3D modeling 820 to 3D printer 840 that is categorized as being capable of 3D printing using rubber.

In addition, data manager 330 may assign divided portions of 3D modeling data to at least one 3D printer based on time or speed requirements included in the request.

Returning to FIG. 3, printing task manager 340 may be configured to transmit, to at least one of the selected 3D printers, a request to print one or more portions of the 3D modeling data in accordance with the sub-data, as divided by data manager 330. That is, printing task manager 340 performs the transmitting for the assignments made by data manager 330.

Figure 4:
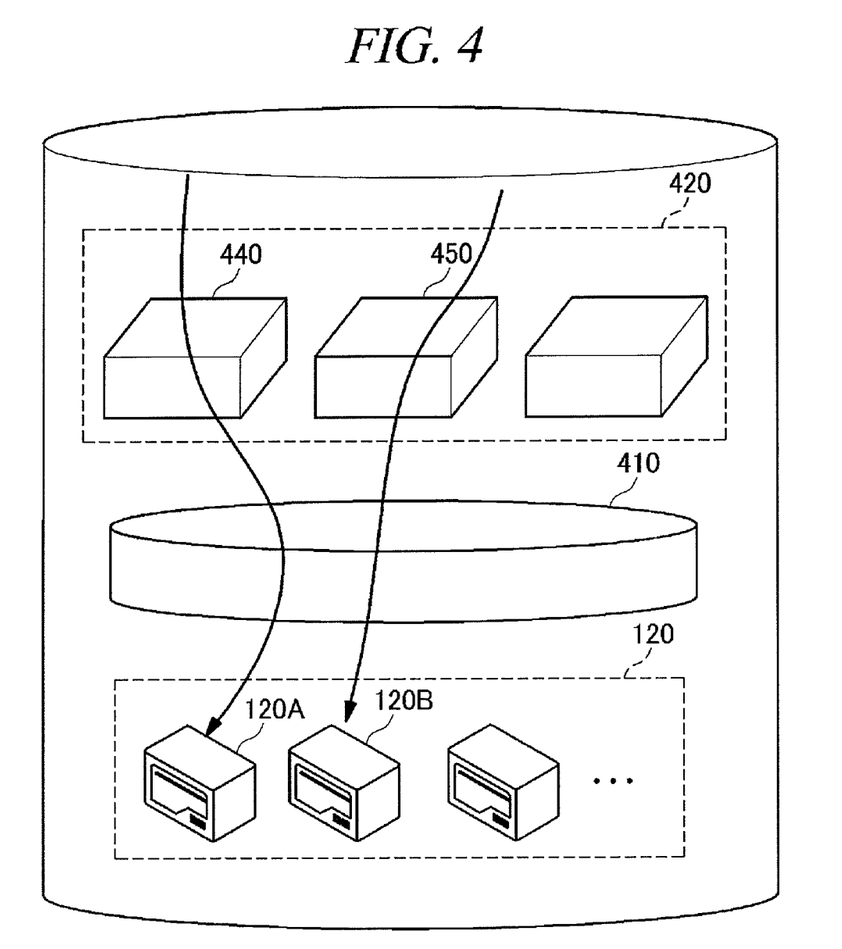
FIG. 4 illustrates an implementation of a cloud environment in accordance with example embodiments of resource allocation for divided 3D printing jobs described herein.

FIG. 4 illustrates an implementation of a cloud environment in accordance with example embodiments of resource allocation for divided 3D printing jobs described herein. Cloud-based 3D printing server 110 may construct the cloud environment by connecting one or more 3D printers 120, integrating a multiple number of drivers compatible with one or more 3D printers to construct an integrated driver 410, and linking a multiple number of slicers 420 compatible with each of the one or more 3D printers.

For example, if divisional printing is carried out by the first 3D printer 120A, cloud-based 3D printing server 110 may select a slicer 440 compatible with the first 3D printer 120A to carry out slicing and produce and transcode a G-code, and transmit the transcoded G-code to the first 3D printer 120A through the integrated driver 410.

In addition, if divisional printing is carried out by the second 3D printer 120B, the cloud-based 3D printing server 110 may select a slicer 450 compatible with the second 3D printer 120B to carry out slicing and produce and transcode a G-code, and transmit the transcoded G-code to the second 3D printer 120B through the integrated driver 410.

Figure 9:
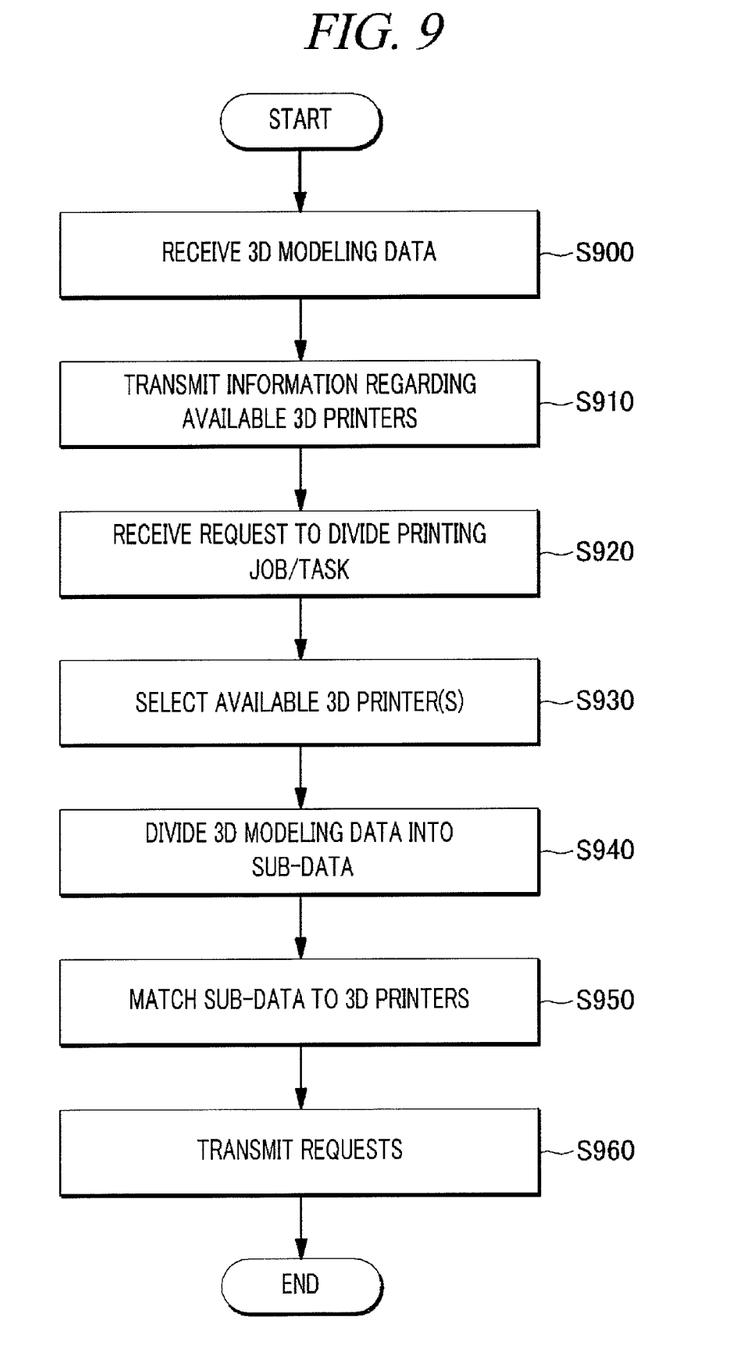
FIG. 9 shows a flow diagram for allocating 3D printing resources, in accordance with embodiments described herein.

FIG. 9 shows a flow diagram for allocating 3D printing resources, in accordance with embodiments described herein. According to the description of the operations in FIG. 9, any of the operations depicted and described herein may be implemented as computer-readable instructions stored on a computer-readable medium. The computer-readable instructions may, for example, be executed by a processor of any one user device 100 and/or 3D printer recommendation server 110, as referenced herein, having a network element and/or any other device corresponding thereto, particularly as applicable to the applications and/or programs described above corresponding to the configuration 1 for 3D printing resource allocation. The example process may include one or more operations, actions, or functions as illustrated by one or more blocks S900, S910, S920, S930, S940, S950, and S900. Although illustrated as discrete blocks, various blocks may be divided into additional blocks, combined into fewer blocks, or eliminated, depending on the desired implementation. Processing may begin at S900.

S900 (receive 3D modeling data) may refer to 3D printing server 110 receiving 3D modeling data from device 100.

S910 (transmit information regarding available 3D printers) may refer to user device 100 transmitting 3D modeling data to a 3D printing server.

S920 (receive request to divide printing job/task) may refer to 3D printing server 110 receiving, from user device 100, a signal that includes a request to complete at least a portion of a 3D printing task or job.

S930 (select available 3D printer(s)) may refer to 3D printing server 110 identifying available ones of available 3D printers connected thereto in a cloud computing environment and, additionally or alternatively, selecting one or more of the available 3D printers for completing at least portions of the requested 3D printing task or job.

S940 (divide 3D modeling data into sub-data) may refer to 3D printing server 110 dividing the received 3D modeling data into multiple portions of sub-data based on the request to complete at least a portion of the 3D printing task or job.

S950 (match sub-data to 3D printers) may refer to 3D printing server 110 matching respective portions of the sub-data to at least one of the selected 3D printers.

S960 (transmit requests) may refer to 3D printing server 110 transmitting, to at least one of the selected 3D printers, a request to print one or more portions of the 3D modeling data in accordance with the sub-data.

Figure 10:
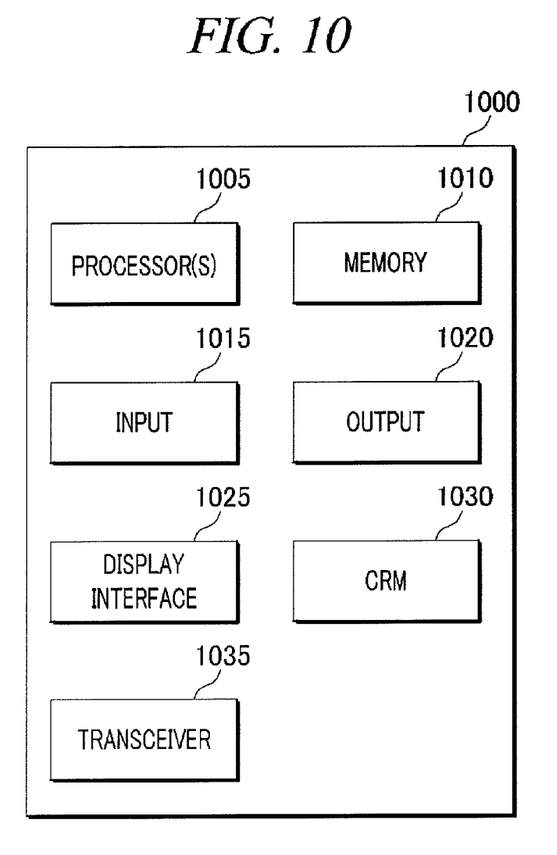
FIG. 10 shows an example computing device on which and by which at least portions of resource allocation for divided 3D printing jobs may be implemented, arranged in accordance with one or more embodiments described herein.

FIG. 10 shows an example computing device on which and by which at least portions of resource allocation for divided 3D printing jobs may be implemented, arranged in accordance with one or more embodiments described herein.

FIG. 10 shows an illustrative computing embodiment, in which any of the processes and sub-processes relating to allocating resources for divided 3D printing jobs may be implemented as instructions stored on a computer-readable medium. The computer-readable instructions may, for example, be executed by a processor of 3D printing management server 110, as referenced herein, having a network element and/or any other device corresponding thereto, particularly as applicable to the applications and/or programs described above corresponding to allocating 3D printing resources.

In a very basic configuration, a computing device 1000 may typically include, at least, one or more processors 1005 and a system memory 1010. Computing device 1000 may also include one or more input components 1015, one or more output components 1020, a display component 1025, a computer-readable medium 1030, and a transceiver 1035.

Processor(s) 1005 may refer to, e.g., a microprocessor, a microcontroller, a digital signal processor, or any combination thereof.

Memory 1010 may refer to, e.g., a volatile memory, non-volatile memory, or any combination thereof. Memory 1010 may store, therein, an operating system, an application, and/or program data. That is, memory 1010 may store executable instructions to implement any of the functions or operations described above and, therefore, memory 1010 may be regarded as a computer-readable medium.

Input component 1015 may refer to a built-in or communicatively coupled keyboard, touch screen, or telecommunication device. Further, an input component, if not built-in to computing device 1000, may be communicatively coupled thereto via short-range communication protocols including, but not limited to, radio frequency or Bluetooth.

Output component 1020 may refer to a component or module, which may be built-in or removable from computing device 1000, which is configured to output data to an external device.

Display component 1025 may refer to, e.g., a solid state display that may have touch input capabilities. That is, a display component may include capabilities that may be shared with or replace those of the aforementioned input components.

Computer-readable medium 1030 may refer to a separable machine readable medium that is configured to store one or more programs that embody any of the functions or operations described above. That is, a computer-readable medium, which may be received into or otherwise connected to a drive component of computing device 1000, may store executable instructions to implement any of the functions or operations described above. These instructions may be complimentary or otherwise independent of those stored by memory 1010.

Transceiver 1035 may refer to a network communication link for computing device 1000, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A 3D printing method, comprising:
receiving, from a device, 3D modeling data;
transmitting, to the device, information regarding one or more categorized capabilities of available 3D printers in a cloud environment,
wherein the one or more categorized capabilities includes a printing precision capability that is relative among the available 3D printers, one of a printing material category, a printing color category, and a time required for completion category;
receiving, from the device, a request to divide a printing task among the available 3D printers in accordance with the one or more categorized capabilities,
wherein the request to divide includes:
a printing precision in accordance with the printing precision capability that is relative among the available 3D printers,
at least one of printing material,
printing color,
time required for completion in accordance with, respectively, the printing material category, the printing color category, and the time required for completion category;
transmitting, to the device, a request to revise the one or more categorized capabilities for at least a portion of the request to divide the printing task if the available 3D printers are unable to satisfy all requested conditions for portions of the divided 3D printing request;
selecting at least one of the available 3D printers to print the divided printing task, including selecting at least one of the available 3D printers having the printing precision capability, which is relative among the available 3D printers, that meets the requested printing precision;
dividing the 3D modeling data into plural portions of sub-data in accordance with the one or more categorized capabilities, including at least the printing precision capability that is relative among the available 3D printers, in response to the request to divide the printing task;
matching at least one of respective portions of the sub-data to corresponding ones of the selected 3D printers in accordance with their categorized capabilities, including matching at least one of the respective portions of the sub-data to at least one of the selected 3D printers that has the printing precision capability, which is relative among the available 3D printers, that meets the requested printing precision and that has the time required for completion capability that meets the requested time required for completion; and
transmitting, to the corresponding ones of the selected 3D printers, a request to print one or more portions of the 3D modeling data in accordance with the sub-data, including transmitting a request to print the one of the respective portions to the at least one of the selected 3D printers that has the printing precision, which is relative among the available 3D printers, capability that meets the requested printing precision.

2. The method of claim 1, wherein the cloud environment includes a host computer that connects each of the available 3D printers, drivers of the available 3D printers, and slicers corresponding to the available 3D printers.

3. The method of claim 1, wherein the transmitting comprises:
transcoding G-code for each portion of the sub-data; and
transmitting the transcoded G-code to each of the selected 3D printers.

4. The method of claim 1, wherein the 3D modeling data is formed by a stereo lithographic process or in accordance with an Additive Manufacturing Format.

5. The method of claim 1, further comprising:
providing the device corresponding specifications for the available 3D printers.

6. The method of claim 5, wherein the corresponding specifications for the available 3D printers includes a printing material, a printing color, and time required for completion.

7. A 3D printing system, comprising:
a device comprising:
a 3D modeling data transmitter configured to transmit 3D modeling data to a 3D printing server, and
a printing request transmitter configured to:
transmit a request to complete at least a portion of a 3D printing job to the 3D printing server, and
transmit a request to revise at least a portion of the 3D printing job to the 3D printing server, if the available 3D printers are unable to satisfy the conditions of the requested portion of the 3D printing job;
the 3D printing server comprising:
a 3D printer provider configured to transmit, to the device, information regarding one or more categorized capabilities of available 3D printers in a cloud environment, wherein the one or more categorized capabilities includes a printing precision capability that is relative among the available 3D printers, one of a printing material category, a printing color category, and a time required for completion category,
a 3D printer selector configured to select at least one of the available 3D printers to print the at least a portion of the 3D printing job, including selecting at least one of the available 3D printers having the printing precision capability, which is relative among the available 3D printers, that meets a printing precision and at least one of, respectively, a printing material, printing color, and time required for completion, included in the request to complete at least a portion of the 3D printing job,
a 3D modeling data divider configured to divide the 3D modeling data into multiple portions of sub-data in accordance with the one or more categorized capabilities, including at least the printing precision capability that is relative among the available 3D printers, in response to the request to complete at least a portion of the 3D printing job,
a data manager configured to match respective portions of the sub-data corresponding ones of the selected 3D printers, including to match at least one of the respective portions of the sub-data to at least one of the selected 3D printers that has the printing precision capability, which is relative among the available 3D printers, that meets the printing precision and at least one of, respectively, a printing material, printing color, and time required for completion included in the request to complete at least a portion of a 3D printing job,
wherein the data manager is to match by matching at least one of the respective portions of the sub-data to at least one of the selected 3D printers that has the time required for completion capability that meets a requested time required for completion included in the request to complete at least a portion of the 3D printing job, and
a printing task manager configured to transmit, to the corresponding ones of the selected 3D printers, a request to print one or more portions of the 3D modeling data in accordance with the sub-data, including transmitting a request to print the one of the respective portions to the at least one of the selected 3D printers that has the printing precision capability, which is relative among the available 3D printers, that meets the printing precision included in the request to complete at least a portion of a 3D printing job; and
a plurality of the 3D printers configured to print at least portions of the 3D modeling data in accordance with the received request.

8. The system of claim 7, the 3D printing server further comprises:
a host computer configured to connect each of the available 3D printers, drivers of the available 3D printers, and slicers corresponding to the available 3D printers.

9. The system of claim 7, the printing request transmitter further configured to:
transcode G-code for each portion of the sub-data; and
transmit the transcoded G-code to each of the selected 3D printers.

10. The system of claim 7,
wherein the one or more categorized capabilities include one of a printing material category, a printing color category, and a time required for completion category; and
wherein the request to complete at least a portion of a 3D printing job further includes at least one of printing material, printing color, and time required for completion in accordance with the printing material category, printing color category, and time required for completion category, respectively.

11. The system of claim 10,
wherein the request to complete at least a portion of a 3D printing job includes a time required for completion; and
wherein the data manager is further configured to match at least one of the respective portions of the sub-data to at least one of the selected 3D printers that has a time required for completion capability that meets the time required for completion included in the request to complete at least a portion of a 3D printing job.

12. A computing device, comprising:
a memory; and
a processing unit configured to:
receive, from a device, 3D modeling data,
transmit, to the device, information regarding one or more categorized capabilities of available 3D printers in a cloud environment, wherein the one or more categorized capabilities includes a printing precision capability that is relative among the available 3D printers, one of a printing material category, a printing color category, and a time required for completion category,
receive, from the device, a request to divide the printing job among the available 3D printers in accordance with the one or more categorized capabilities, wherein the request to divide includes:
a printing precision, which is relative among the available 3D printers, in accordance with the relative printing precision capability,
at least one of printing material,
printing color,
time required for completion in accordance with, respectively, the printing material category, the printing color category, and the time required for completion category, transmit, to the device, a request to revise at least a portion of the printing job if the available 3D printers are unable to satisfy all conditions for portions of the divided 3D printing job, select at least one of the available 3D printers to print the divided printing job, including selecting at least one of the available 3D printers having the printing precision capability, which is relative among the available 3D printers, that meets the requested printing precision, divide the 3D modeling data into plural portions of sub-data in accordance with the one or more categorized capabilities, including at least the printing precision capability that is relative among the available 3D printers, in response to the request to divide the printing job, match at least one of respective portions of the sub-data to corresponding ones of the 3D printers in accordance with their categorized capabilities, including matching at least one of the respective portions of the sub-data to at least one of the selected 3D printers that has the printing precision capability, which is relative among the available 3D printers, that meets the requested printing precision, and transmit, to the corresponding ones of the selected 3D printers, a request to print one or more portions of the 3D modeling data in accordance with the sub-data, including transmitting a request to print the one of the respective portions to the at least one of the selected 3D printers that has the printing precision capability, which is relative among the available 3D printers, that meets the requested printing precision and that has the time required for completion capability that meets the requested time required for completion.

* * * * *